United States Patent [19]  [11] 4,300,259
Maiocco  [45] Nov. 17, 1981

[54] DEVICE FOR CONNECTING A WIPER BLADE HOLDER TO A WIPER ARM

[75] Inventor: Guiseppe Maiocco, Rivoli, Italy

[73] Assignee: ARMAN S.p.A., Turin, Italy

[21] Appl. No.: 50,151

[22] Filed: Jun. 20, 1979

[30] Foreign Application Priority Data

Jun. 23, 1978 [IT] Italy ............................... 68478 A/78
Oct. 10, 1978 [IT] Italy ............................... 69337 A/78

[51] Int. Cl.³ ............................ B60S 1/32; B60S 1/40
[52] U.S. Cl. ................................ 15/250.32; 403/329; 403/388
[58] Field of Search ........................ 15/250.31, 250.32; 403/316, 317, 329, 330, 388

[56] References Cited

U.S. PATENT DOCUMENTS 4,083,642 4/1978 Journee ........................ 15/250.32 X
4,114,227 9/1978 Blackman ....................... 15/250.32

FOREIGN PATENT DOCUMENTS

2310374 9/1974 Fed. Rep. of Germany ... 15/250.32
2404004 7/1975 Fed. Rep. of Germany ... 15/250.32

Primary Examiner—Christopher K. Moore
Attorney, Agent, or Firm—Wegner, Stellman, McCord, Wood & Dalton

[57] ABSTRACT

A device for connecting the superstructure of a wiper blade in side-by-side relationship to a wiper arm. The device comprises a pin which extends through both the superstructure and the wiper arm and has an enlarged portion on one end of the pin operable to limit longitudinal and to prevent rotational movement of the pin relative to the superstructure of the wiper blade. The device also includes a member which is at least partially supported by a portion of the pin outside the wiper arm with a second member resiliently urging the wiper arm toward the superstructure. The superstructure acts as a stop limiting the relative movement of the wiper arm in the direction of the superstructure.

10 Claims, 26 Drawing Figures

DEVICE FOR CONNECTING A WIPER BLADE HOLDER TO A WIPER ARM

BACKGROUND OF THE INVENTION

Various devices have heretofore been suggested for connecting the superstructure of a wiper blade to the upper end of a wiper arm. Such connecting devices are used, for example, to mount the wiper blades on motor vehicles.

Two general types of connecting devices have been suggested, namely, those of the dorsal type and those of the lateral type. In the first case, the connection between the wiper arm and the wiper blade is accomplished over and above the central part of the superstructure of the wiper blade: on its dorsal or back side. In the latter case, the wiper arm is positioned adjacent, in side-by-side relationship with, the central part of the superstructure of the wiper blade.

Lateral connecting devices are advantageous by comparison with dorsal connecting devices because the total height of the wiper and arm assembly above the surface to be wiped is substantially less; as a consequence, a lateral assembly is less subject to disruption by the action of wind which tends to raise the wiper blade and arm and, in this way, to diminish the efficiency of the wiping action of the wiper blade.

BRIEF DESCRIPTION OF THE PRESENT INVENTION

The present invention is based upon the discovery of an improved way for connecting the superstructure of a wiper blade to, and in side-by-side relationship with, the upper extremity of a wiper arm. In general, the device comprises a pin which extends through both the superstructure and the wiper arm. The improvement according to the invention involves means operable to limit longitudinal and to prevent rotational movement of the pin relative to the superstructure of the wiper blade, and of means supported by a portion of the pin which is outside the wiper arm, which means resiliently urge the wiper arm toward the superstructure, and wherein the superstructure acts as a stop limiting the relative movement of the wiper arm in the direction thereof. The Main advantages of the lateral connecting device of the present invention are that it is strong and of simple construction, easy to manufacture and to assemble, inexpensive to manufacture, capable of easy and quick connection and disconnection, and is capable of accommodating many types of wiper arms.

DESCRIPTION OF THE PREFERRED EMBODIMENTS

Figure 1:
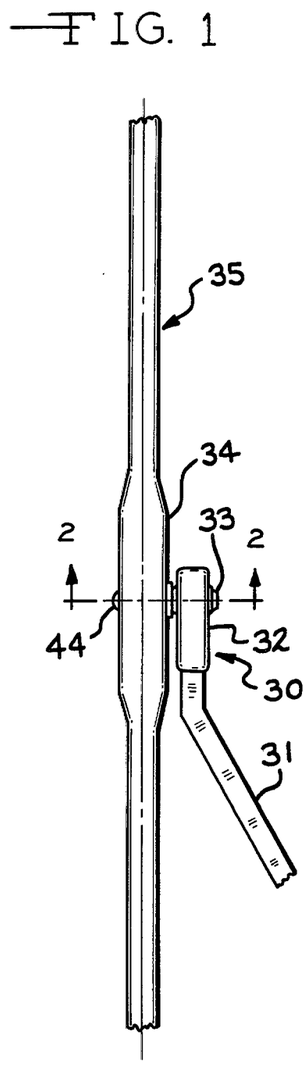
FIG. 1 is a schematic plan view showing a wiper blade superstructure mounted in side-by-side relationship with a wiper arm.

A device according to the instant invention is indicated generally at 30 in FIG. 1. The device 30 comprises a wiper arm 31 having a terminal portion 32 which is generally U-shaped in cross section, and which is pinned by a pin 33 to the central portion 34 of a wiper blade superstructure 35 which is shown fragmentarily in FIG. 1.

Figure 2:
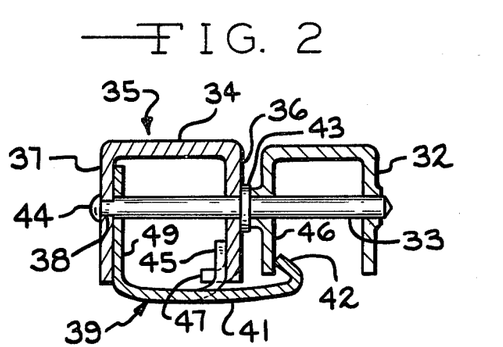
FIG. 2 is a vertical sectional view, to an enlarged scale, along the line 2—2 of FIG. 1, and showing a connecting device according to the invention.

As can be seen in FIG. 2, the central portion 34 of the wiper blade superstructure 35 is generally U-shaped in cross section, having holes in legs 36 and 37 through which the pin 33 extends. The hole in the leg 36 is circular in cross section, while that in the leg 37 is rectangular to receive a rectangular portion 38 of the pin 33 and thereby prevent rotation of the pin 33 relative to the central portion 34 of the wiper blade superstructure 35. The device of FIG. 2 also includes a resilient L-shaped member 39 having a leg 40 which butts against the leg 37 of the central portion 34 of the superstructure 35 and a resilient leg 41 which extends below the extremity of the leg 36, and terminates in a hook 42 which urges the terminal portion 32 of the arm 31 toward the central portion 34 of the superstructure 35. A radially enlarged portion 43 of the pin 33 acts as a flange against which the terminal portion 32 of the arm 31 bears and which, in turn, bears against the leg 36 of the central portion 34 of the superstructure 35. Movement of the pin 33 to the right in FIG. 2 is prevented by a head 44 thereon which bears against the exterior wall of the leg 37. The resilient, L-shaped member 39 also includes a pair of legs 45 which bear against the interior surface of the leg 36.

Figure 5:
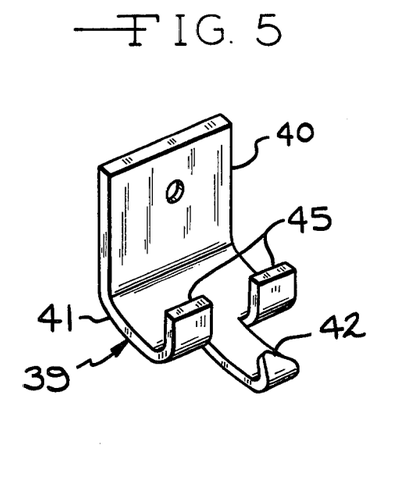
FIG. 5 is a perspective view showing an L-shaped resilient member which is a part of the embodiments of the invention shown in FIGS. 2 and 3.

The structure of the resilient, L-shaped member 39 is shown in greater detail in FIG. 5.

Figure 6:
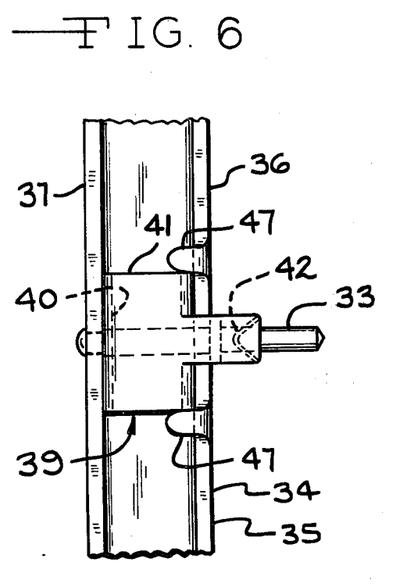
FIG. 6 is a bottom plan view of the apparatus of FIG. 2, but omitting a wiper arm part which is shown in FIG. 2.

Referring, again, to FIG. 2, the wiper blade superstructure 35 can be disassembled from the wiper arm 31 merely by moving the hook 42 and the leg 41 vertically downward from the position shown in FIG. 2 until it clears the lower extremity of a leg 46 of the terminal portion 32 of the arm 31; the wiper blade superstructure 35 can then be moved to the left in FIG. 2 for separation from the arm 31. As can be seen in FIG. 6, which is a bottom plan view of the superstructure 35 separated from the arm 31, the central portion 34 of the superstructure 35 includes tabs 47, one of which is on each side of the resilient, L-shaped member 39 to provide further support therefor.

In the following description of FIGS. 3, 4, 7 and following, parts which are identical with those shown in FIG. 2 and described in connection therewith are assigned the same reference numerals.

Figure 3:
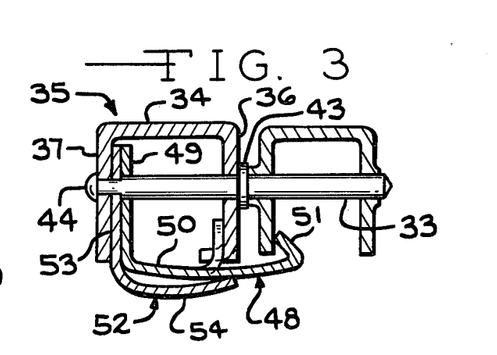
FIG. 3 is a sectional view similar to FIG. 2, showing a second embodiment of the present invention.

Referring to FIG. 3, an embodiment of the invention similar to that of FIG. 2 is shown, with the exception that a resilient, L-shaped member indicated generally at 48 has a leg 49, a leg 50 and a hook 51. The leg 50 is slightly shorter than the leg 41 (FIG. 2) to accommodate a leaf spring indicated generally at 52 having a leg 53 positioned between the leg 49 of the L-shaped member 48 and the leg 37 of the superstructure 35 and a leg 54 which exerts a force tending to move the leg 50 of the resilient member 48 upwardly and, as a consequence, increasing the force required to move the hook 51 downwardly to clear the leg 46 of the terminal portion 32 of the arm 31.

Figure 4:
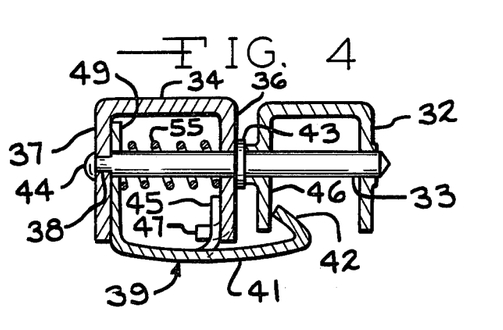
FIG. 4 is a sectional view similar to FIGS. 2 and 3, showing a third embodiment of the present invention.

Another embodiment of the invention is shown in FIG. 4; this embodiment is also similar to that in FIG. 2, the only difference being a coil spring 55 which serves the same function as does the leaf spring 52 in the embodiment shown in FIG. 3.

It is desirable that the region of contact between the wiper arm and the wiper blade superstructure be as close as possible to the centerline of the latter. A central portion of a superstructure which minimizes the distance between the centerline thereof and the point of contact with the wiper arm is indicated generally at 56 in FIG. 7. The central portion of the superstructure 56 differs from the superstructure 35 (FIG. 1) in that the side thereof adjacent the wiper arm is essentially straight, rather than laterally enlarged.

Figure 7:
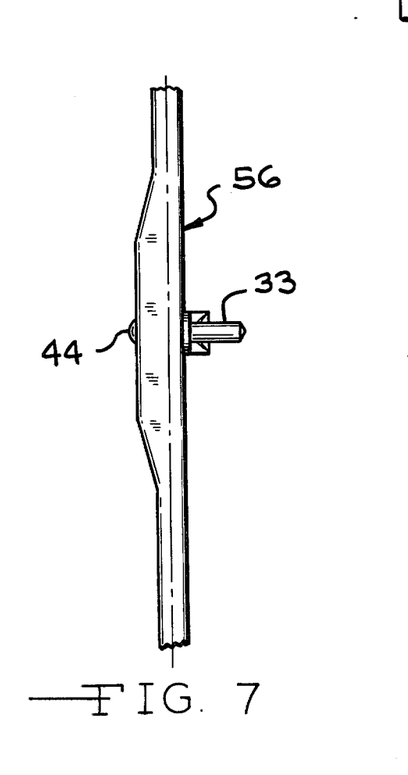
FIG. 7 is a plan view showing the superstructure of a wiper blade used in a device according to the invention.
Figure 8:
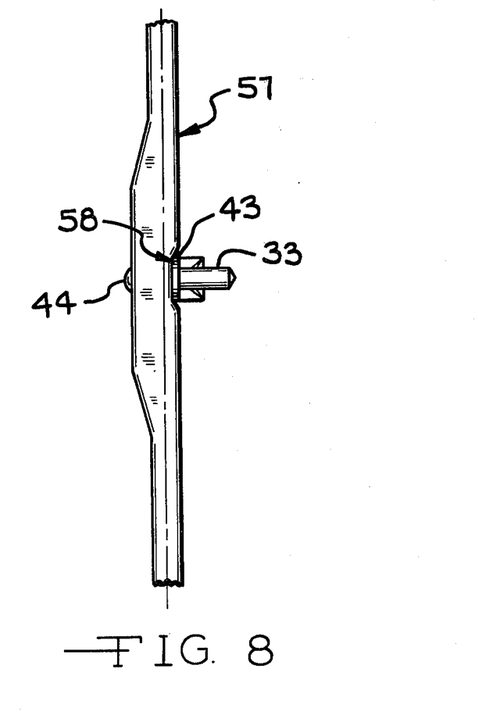
FIG. 8 is a plan view of the superstructure of a wiper blade which can be used in a device constituting a second embodiment of the invention.

A central portion of a superstructure indicated generally at 57 in FIG. 8 is similar to that shown in FIG. 7 with the exception that the FIG. 8 superstructure 57 has an indentation indicated generally at 58 to receive the radially enlarged portion 43 of the pin 33.

Figure 9:
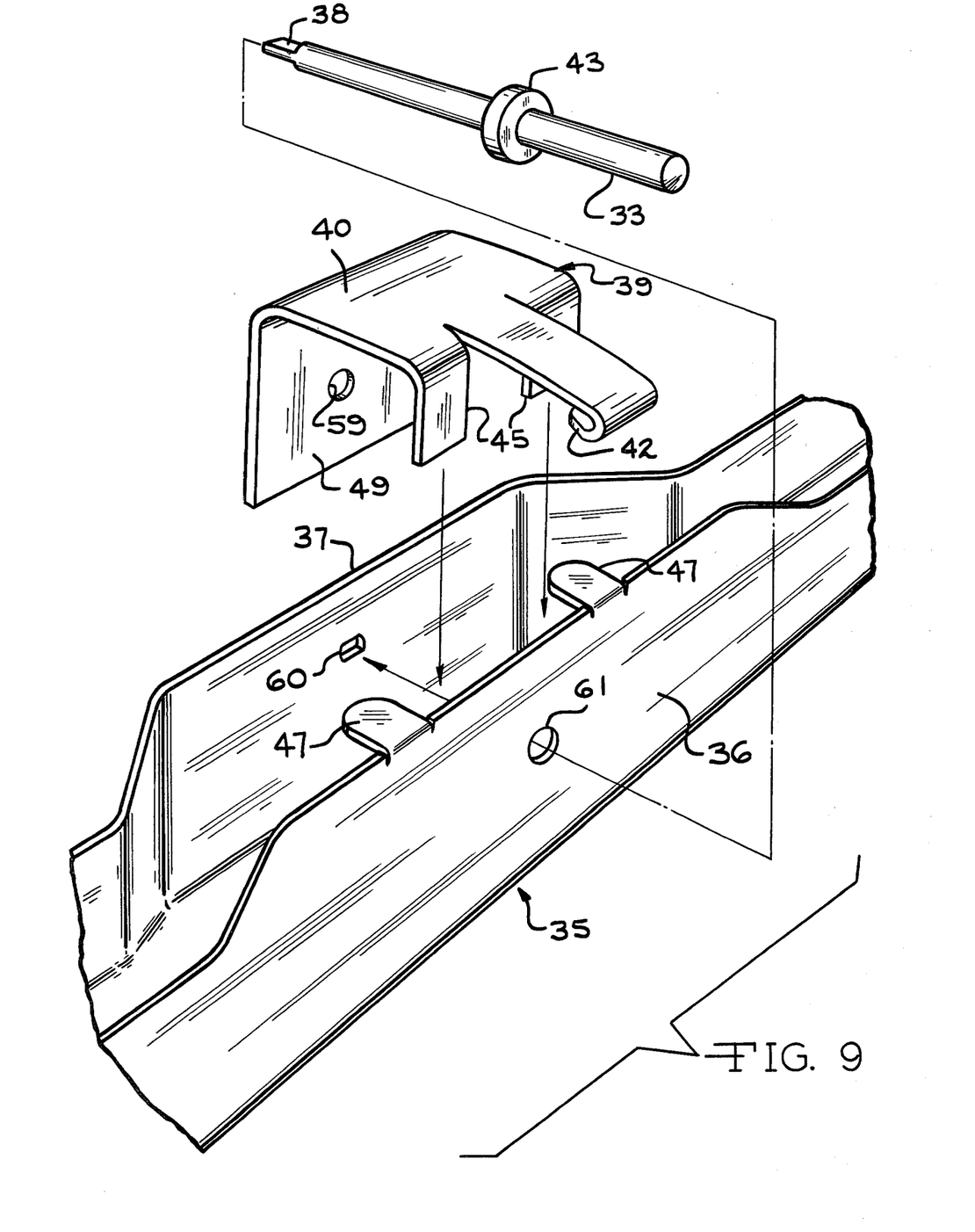
FIG. 9 is an exploded view in perspective showing the steps involved in assembling the embodiment of the invention shown in FIG. 2.

Referring to FIG. 9, assembly of the pin 33 and the resilient, L-shaped member 39 with the wiper blade superstructure 35 involves merely lowering the L-shaped member 39 from the position shown until a hole 59 in the leg 40 thereof is aligned with a slot 60 in the sidewall 37 of the superstructure 35. The pin 33 is then inserted through a hole 61 in the wall 36 of the superstructure 35, the hole 59 and the slot 60. The terminal portion 38 of the pin 33 extends through and beyond the wall 37 of the superstructure 35, while the flange 43 bears against the wall 36. The protruding portion of the end 38 of the pin 33 is then headed, for example by a riveting operation, to form the head 44 (FIG. 2); the pin 43 is then locked against longitudinal movement relative to the superstructure 35 by the head 44 and the flange 43, and against rotational movement by engagement of the end portion 38 (FIG. 9) of rectangular cross section in the slot 60.

Figure 10:
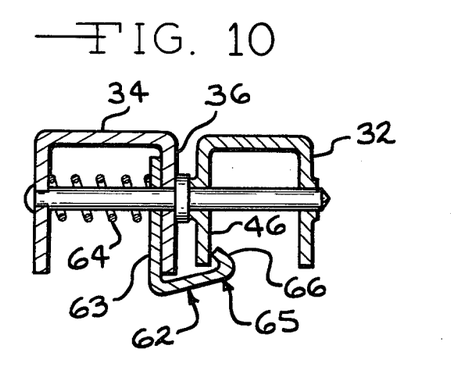
FIG. 10 is a view similar to FIGS. 2-4 showing still another embodiment of the present invention.

Referring to FIG. 10, in another embodiment, the terminal portion 32 of the wiper arm 31 is attached to the central portion 34 of the wiper blade superstructure by a resilient, L-shaped member 62 having a leg 63 which is urged into contact with the sidewall 36 of the central superstructure portion 34 by a spring 64 and a leg 65 which terminates in a hook 66 that engages the wall 46 in the manner previously described.

Figure 11:
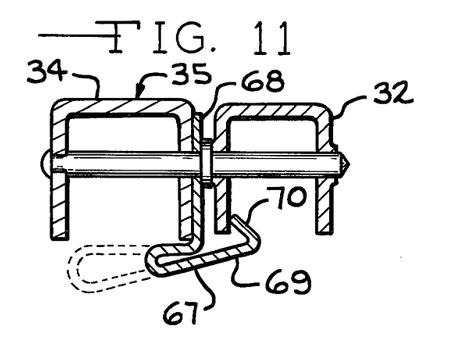
FIG. 11 is a view similar to FIGS. 2-4 and 10 showing yet another embodiment of the invention.

The embodiment shown in FIG. 11 is similar to that of FIG. 10 with the exception that an L-shaped member indicated generally at 67 has a leg 68 which is locked between the flange 43 of the pin 33 and the wall 36 of the central portion 34 of the wiper blade superstructure 35. The member 67 also has a leg 69 which terminates in a hook 70 that engages the wall 46 of the terminal portion 32 of the wiper blade 31 in the manner previously described.

Figure 12:
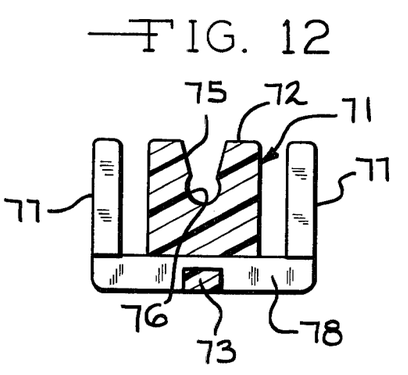
FIG. 12 is a view in vertical section of a part which constitutes an essential element of still another embodiment of the invention.
Figure 13:
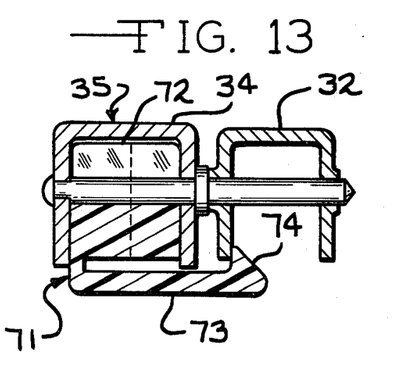
FIG. 13 is a vertical sectional view similar to FIGS. 2-4, 10 and 11 showing the embodiment of the invention for which the part of FIG. 12 is an essential element.
Figure 14:
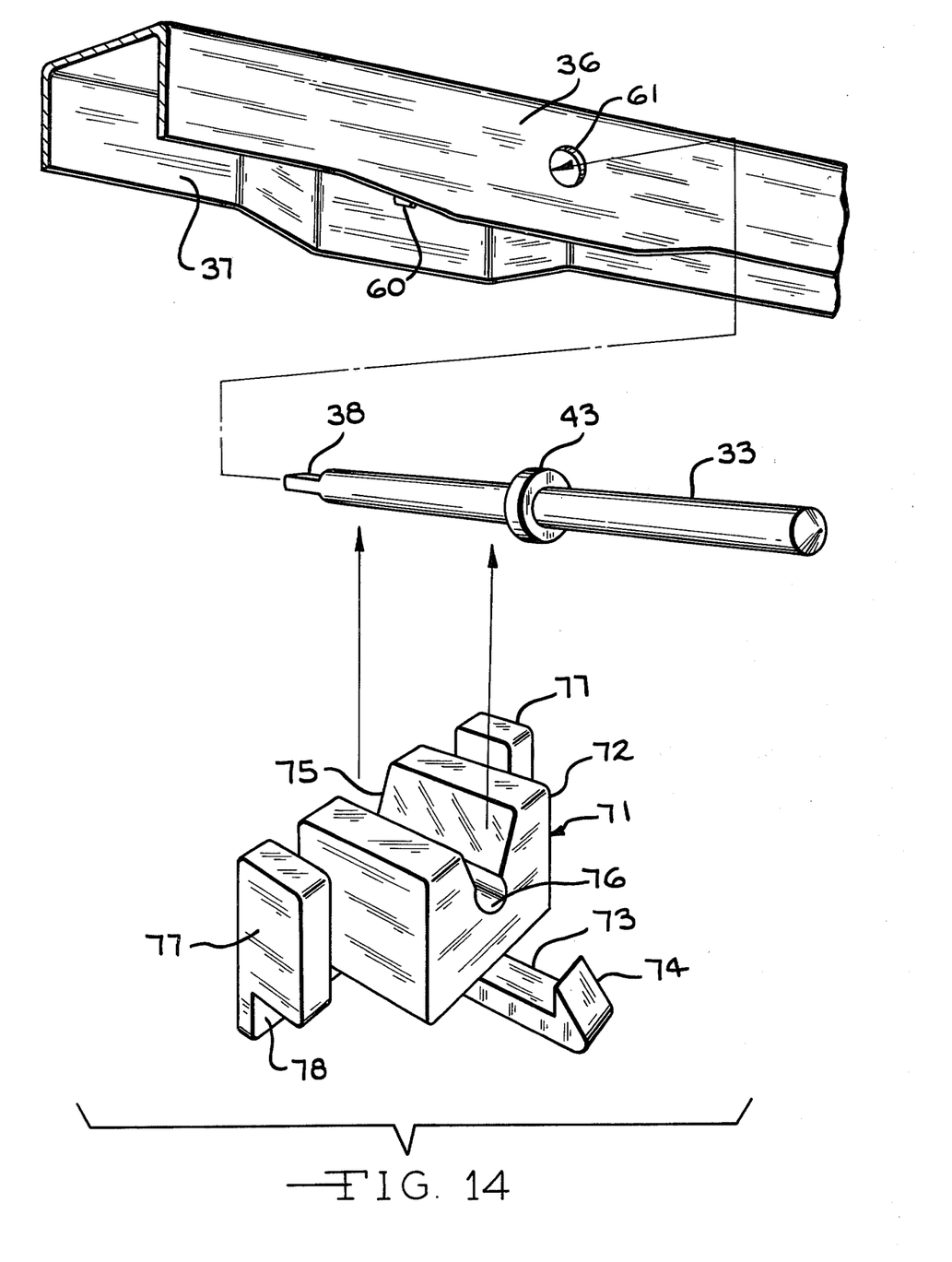
FIG. 14 is an exploded view showing, diagrammatically, the steps involved in assembling the embodiment of the invention shown in FIG. 13.

Still another embodiment of the invention is shown in FIGS. 12 and 13, and its manner of assembly is shown in FIG. 14. As can best be seen in FIG. 13, the terminal portion 32 of the wiper arm 31 is locked to the central portion 34 of the wiper blade superstructure 35 by a body 71 of a resilient, but comparatively rigid, synthetic resinous material. The body 71 is made up of a block 72 which substantially completely fills a part of the central portion 34 of the wiper blade superstructure 35 and an integral arm 73 terminating in a hook 74 which engages the leg 46 of the terminal portion 32 of the wiper arm 31 in the manner previously described. As best seen in FIGS. 12 and 14, the block 72 has an opening 75 in its upper portion which is generally trapezoidal in cross section, and which terminates at the upper extremity of another opening 76 which is, in cross section, a fraction greater than one-half of a circle. As best seen in FIG. 14, the block 72 is carried by a metal support having vertically extending end members 77 and an integral base 78.

To assemble the device, as shown in FIG. 14, the pin 33 is first inserted through the opening 61 in the wall 36 and advanced until the rectangular end portion 38 thereof enters the slot 60 in the wall 37. The protruding portion of the end 38 can then be headed, for example by riveting, and the body 71 and associated parts can be moved upwardly into engaging relationship with the portion of the pin 33 which is between the walls 36 and 37 of the central portion 34 of the superstructure 35.

Figure 15:
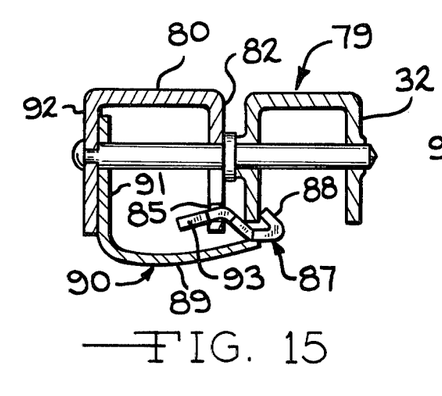
FIG. 15 is a view similar to FIGS. 2-4, 10, 11 and 13 showing still another embodiment of a device according to the invention.
Figure 19:
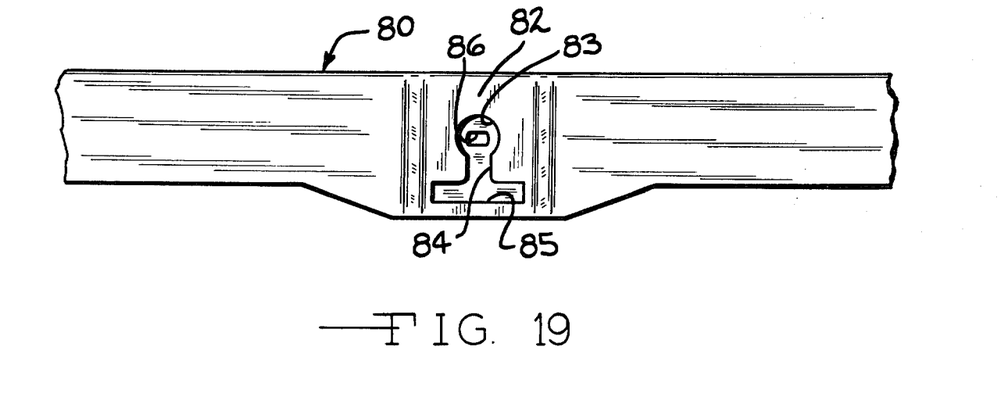
FIG. 19 is a view in elevation of the side of a wiper blade superstructure of the devices of FIGS. 15 and 16 which is adjacent a wiper arm shown in those views.

Another embodiment of a device according to the invention is indicated generally at 79 in FIG. 15. The device 79 includes a central portion 80 of a modified central superstructure. Referring to FIG. 19, the central superstructure portion 80 has a recessed central wall portion 82 in which there is an opening having a circular upper portion 83, a vertically extending, generally rectangular central portion 84, and a lower, generally rectangular, horizontally extending portion 85. There is also a rectangular slot 86 in the sidewall of the central superstructure portion 80 opposite the wall 82.

Referring to FIG. 15, the device 79 also includes an arm 87 which extends through the opening 85 in the sidewall 82 and terminates in a hook 88 which locks the terminal portion 32 of the wiper arm to the central portion 80 of the superstructure, being urged into locking position by an arm 89 of a resilient member 90 which also includes an arm 91 that is supported by the pin 33 adjacent a wall 92 of the central portion 80 of the superstructure.

Figure 18:
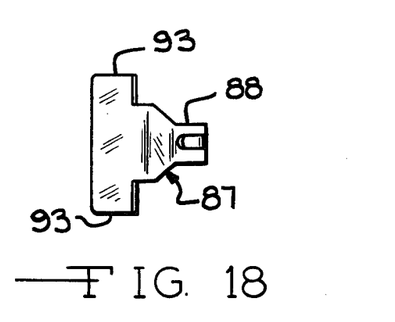
FIG. 18 is a plan view of a hook which is an essential part of the devices of FIGS. 15 and 16.

As best seen in FIG. 18, the arm 87 has laterally enlarged wings 93. When the arm 87 is inserted in the horizontally extending opening 85 of the sidewall 82 (see FIG. 19), the wings 93 extend beyond the ends of the opening 85, thereby preventing the arm 87 from being moved to the right beyond the position shown in FIG. 15.

Figure 16:
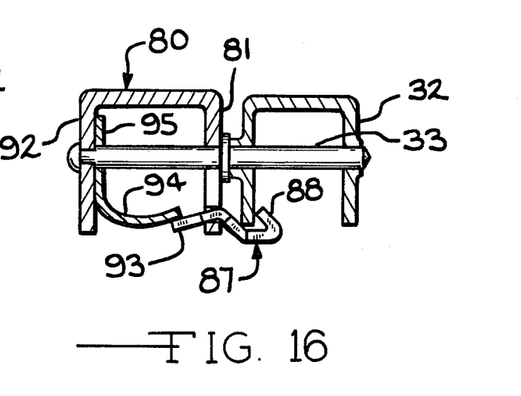
FIG. 16 is a view similar to FIGS. 2-4, 10, 11, 13 and 15 showing yet another embodiment of a device according to the invention.
Figure 17:
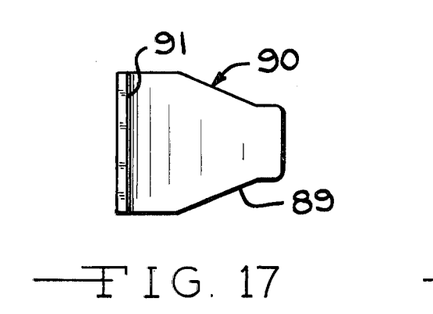
FIG. 17 is a plan view of a resilient member which is an essential part of the device of FIG. 15.

A modification of the device 79 of FIG. 15 is shown in FIG. 16. The only difference is the substitution for the member 90 of the device 79 of FIG. 15 of a resilient member having a leg 94 which resiliently urges the arm 87 into a locked position relative to the terminal portion 32 of the wiper arm and a leg 95 which is carried by the pin 33, and positioned closely adjacent the sidewall 92 of the superstructure 80.

Figure 20:
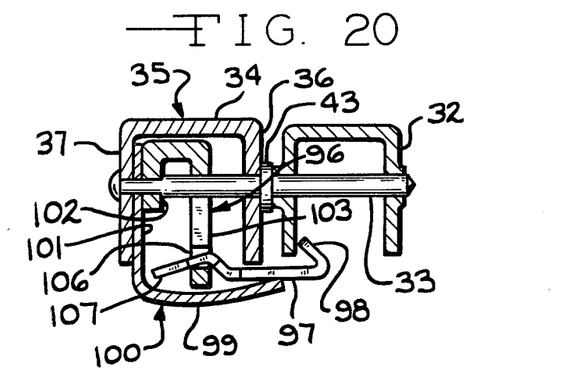
FIG. 20 is a view similar to FIGS. 2-4, 10, 11, 13, 15 and 16 showing still another embodiment of a device according to the invention.

Referring to FIG. 20, still another device according to the invention includes a J-shaped member 96 which receives and supports, as subsequently explained in more detail, an arm 97 having a hook 98 which is urged into locking engagement with the terminal portion 32 of the wiper arm 31 by a leg 99 of a generally L-shaped resilient member 100. The member 100 also has a leg 101 which is supported by the pin 33 closely adjacent the sidewall 37 of the central portion 34 of the superstructure 35. The J-shaped member 96 has a relatively short leg 102 adjacent the leg 101 of the resilient member 100 and a relatively longer leg 103 by whivch the arm 97 is supported.

Figure 21:
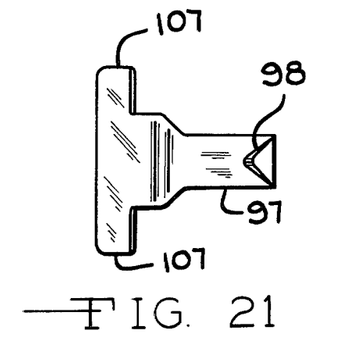
FIG. 21 is a plan view of a hook member which is a part of the device shown in FIG. 20.
Figure 22:
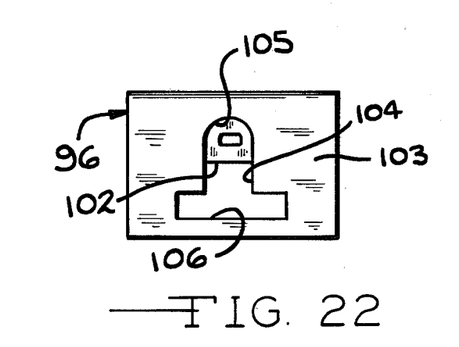
FIG. 22 is a view in elevation showing a generally J-shaped hook member which is a part of the device shown in FIG. 20.

As best seen in FIG. 22, the relatively longer leg 103 of the J-shaped member 96 has a vertically extending generally horizontal opening 104 extending therethrough, and terminating, at its upper extremity in a semi-circular portion 105. Connecting with the opening 104 at its lower extremity is a generally rectangular opening 106 extending at right angles to the opening 104. As shown in FIG. 20, the arm 97 extends through the opening 106 until tabs 107 (see, also, FIG. 21) prevent further movement to the right in FIG. 20.

Figure 23:
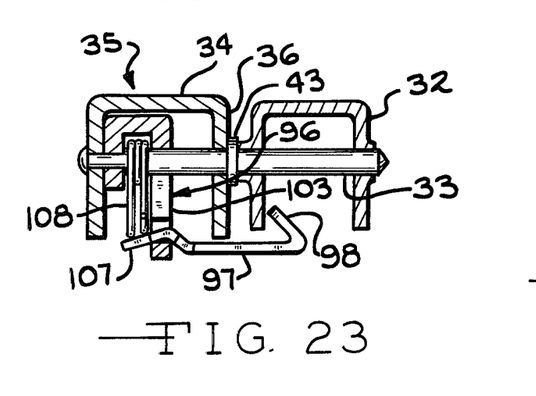
FIG. 23 is a view similar to FIGS. 2-4, 10, 11, 13, 15, 16 and 20 showing a device constituting still another embodiment of the present invention.
Figure 24:
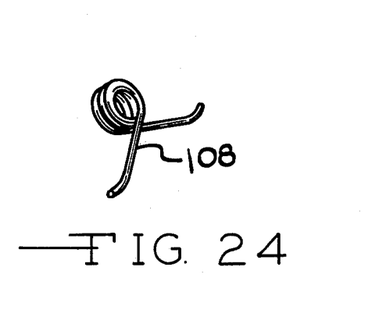
FIG. 24 is a spring which is an essential part of the device of FIG. 23.

A modification of the apparatus shown in FIGS. 20-22 is shown in FIGS. 23 and 24. The latter apparatus is identical with the former except that a spring 108 replaces the resilient member 100 of the FIG. 20 apparatus, urging the portion of the arm 97 between the tabs 106 downwardly (FIG. 23) so that the hook 98 of the arm 97 is urged into locking engagement with the terminal portion 32 of the wiper arm 31.

Figure 25:
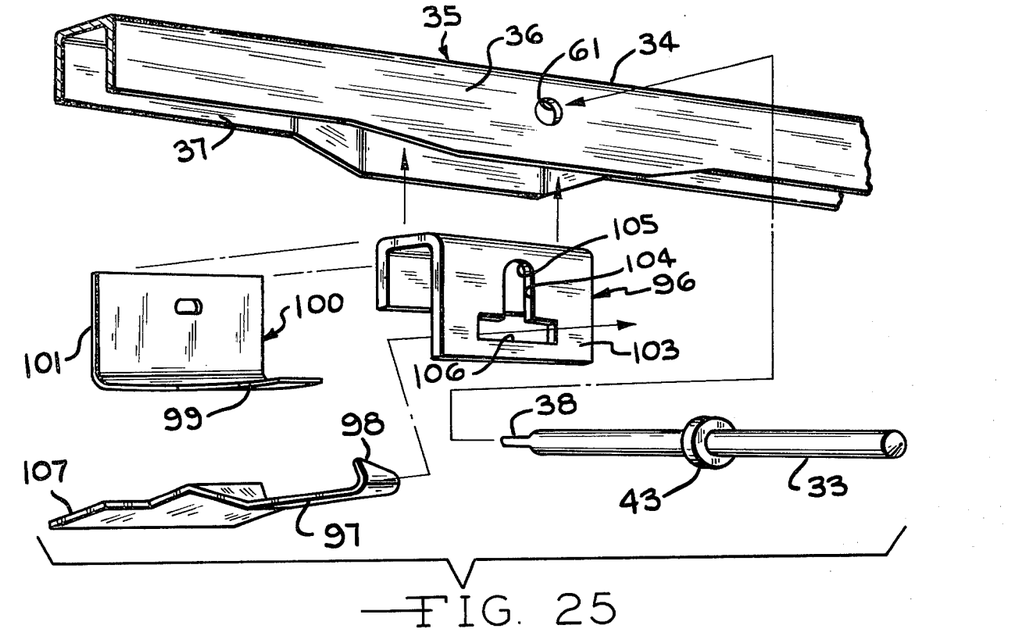
FIG. 25 is an exploded view in perspective of the various elements of the apparatus of FIG. 20 showing the manner in which they are assembled.
Figure 26:
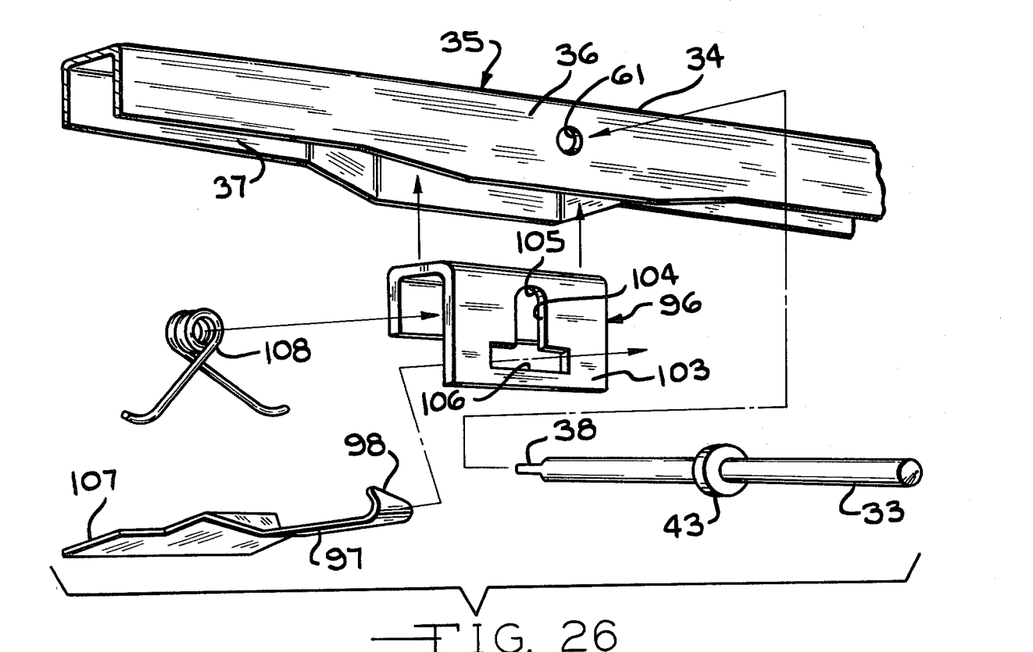
FIG. 26 is an exploded view in perspective of the various elements of the device of FIG. 23 showing the manner in which they are assembled.

The manner in which the apparatus of FIGS. 20-22 is assembled is shown in FIG. 25, while the manner of assembly of that of FIGS. 23 and 24 is shown in FIG. 26.

It will be apparent that various changes and modifications can be made from the specific details shown in the attached drawings and described in connection therewith without departing from the spirit and scope of the invention as defined in the appended claims.

What I claim is:

1. In a device for connecting the superstructure of a wiper blade to, and in side-by-side relationship with the upper extremity of a wiper arm, which device comprises a pin which extends through both the superstructure and the wiper arm, the improvement of means operable to limit longitudinal and to prevent rotational movement of the pin relative to the superstructure of the wiper blade, and of means at least partially supported by a portion of the pin which is outside the wiper arm, which means resiliently urge the wiper arm toward the superstructure, and wherein the superstructure acts as a stop limiting the relative movement of the wiper arm in the direction thereof.

2. In a device as claimed in claim 1 wherein the superstructure of the wiper blade is U-shaped, the improvement wherein the means operable to limit longitudinal movement of the pin includes a rivet on the pin, which rivet is outside the leg of the U-shaped superstructure which is opposite the wiper arm.

3. In a device as claimed in claim 2, the improvement wherein the means operable to limit longitudinal movement of the pin also includes a radially enlarged pin portion between the superstructure and the wiper arm.

4. In a device as claimed in claim 1, the improvement wherein said means resiliently urging the wiper arm toward the superstructure is a resilient L-shaped part having a first leg with an opening therethrough in which the pin is received in supporting relationship therewith and a second leg which terminates in a hook which urges the wiper arm toward the superstructure.

5. In a device as claimed in claim 4, the improvement of a resilient L-shaped member having a first leg with an opening therethrough in which the pin is received in supporting relationship therewith and a second leg operable to urge the hook of said L-shaped part toward the pin.

6. In a device as claimed in claim 4, the improvement of a coil spring surrounding the portion of the pin which passes through the superstructure of the wiper blade, and operable to urge the hook of said L-shaped part toward the pin.

7. In a device as claimed in claim 4, the improvement wherein the leg of said L-shaped part with an opening therethrough in which the pin is received is positioned between the superstructure of the wiper blade and the wiper arm.

8. In a device as claimed in claim 1, the improvement wherein said means resiliently urging the wiper arm toward the superstructure includes a body of a resilient material supported by substantially all of the portion of the pin which extends through the superstructure of the wiper blade.

9. In a device as claimed in claim 8, the improvement wherein said body of a resilient material has a trapezoidally shaped slot and an opening adjacent the slot for receiving the pin, the slot, the opening and the pin being so sized and located that the pin can be mounted on the superstructure of the wiper blade and said body can then be snapped onto the pin.

10. In a device as claimed in claim 1 wherein the superstructure of the wiper blade is U-shaped, having a web and side walls, the improvement wherein said means resiliently urging the wiper arm toward the superstructure is composed of
  (1) a support which is generally J-shaped in cross-section, having a web, a short side-wall and a long side-wall,
  (2) a hook, and
  (3) a resilient member,
said support having pin-receiving openings through which the pin extends mounting said support interiorly of the superstructure with its short side-wall adjacent a side wall of the superstructure and its web adjacent the web thereof, the long side-wall of said support having an opening through which said hook extends, and said resilient member applying a force to said hook, which force causes said hook to urge the wiper arm toward the superstructure.

* * * * *